(12) United States Patent
Horinaka et al.

(10) Patent No.: US 7,251,606 B2
(45) Date of Patent: Jul. 31, 2007

(54) ROBOT DEVICE WITH CHANGING DIALOGUE AND CONTROL METHOD THEREFOR AND STORAGE MEDIUM

(75) Inventors: Rika Horinaka, Tochigi (JP); Masahiro Fujita, Saitama (JP); Atsushi Okubo, Tokyo (JP); Kenta Kawamoto, Tokyo (JP); Gabriel Costa, Tokyo (JP); Masaki Fukuchi, Tokyo (JP); Osamu Hanagata, Tokyo (JP); Kotaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 774 days.

(21) Appl. No.: 10/296,403

(22) PCT Filed: Mar. 26, 2002

(86) PCT No.: PCT/JP02/02889

§ 371 (c)(1),
(2), (4) Date: May 19, 2003

(87) PCT Pub. No.: WO02/076687

PCT Pub. Date: Oct. 3, 2002

(65) Prior Publication Data

US 2003/0182122 A1    Sep. 25, 2003

(30) Foreign Application Priority Data

Mar. 27, 2001   (JP)   ............................... 2001-091029

(51) Int. Cl.
*G10L 15/22* (2006.01)

(52) U.S. Cl. ...................................................... 704/272
(58) Field of Classification Search ................. 704/272
See application file for complete search history.

(56) References Cited

U.S. PATENT DOCUMENTS 6,509,707 B2 *   1/2003   Yamashita et al. ........... 318/567

(Continued)

FOREIGN PATENT DOCUMENTS

CN          1287522        3/2001

(Continued)

*Primary Examiner*—Susan McFadden
(74) *Attorney, Agent, or Firm*—Frommer Lawrence & Haug LLP; William S. Frommer; Paul A. Levy

(57) ABSTRACT

Sentences corresponding to internal statuses of a robot device or the like are created and uttered, thereby expressing the internal statuses. The robot device or the like comprise means for recognizing an external status, and means for generating an emotion based on the internals status, whereby a change in the emotion is reflected upon a dialogue. The internal status is not associated with a sentence, but it exists independently of the system and is always varied depending on various external inputs and internal changes of the system. Accordingly, even when the same question is made on the robot device or the like, the contents of a reply are changed depending on the internal status at that time, and a manner of providing a reply also differs depending on the internal status.

22 Claims, 8 Drawing Sheets

U.S. PATENT DOCUMENTS

| | | | |
|---|---|---|---|
| 6,510,417 B1 * | 1/2003 | Woods et al. | 704/275 |
| 6,560,511 B1 * | 5/2003 | Yokoo et al. | 700/245 |
| 6,684,127 B2 * | 1/2004 | Fujita et al. | 700/245 |
| 7,023,164 B2 * | 4/2006 | Iribe et al. | 318/563 |
| 7,027,975 B1 * | 4/2006 | Pazandak et al. | 704/9 |
| 7,065,490 B1 * | 6/2006 | Asano et al. | 704/275 |
| 7,076,334 B2 * | 7/2006 | Sabe et al. | 700/245 |
| 7,088,853 B2 * | 8/2006 | Hiroe et al. | 382/153 |
| 7,139,642 B2 * | 11/2006 | Kamoto et al. | 700/248 |

FOREIGN PATENT DOCUMENTS

| | | |
|---|---|---|
| EP | 1 059 147 | 12/2000 |
| JP | 2001-212783 | 8/2001 |
| KR | 2001-0031909 | 4/2001 |
| WO | WO 00/15396 | 3/2000 |

\* cited by examiner

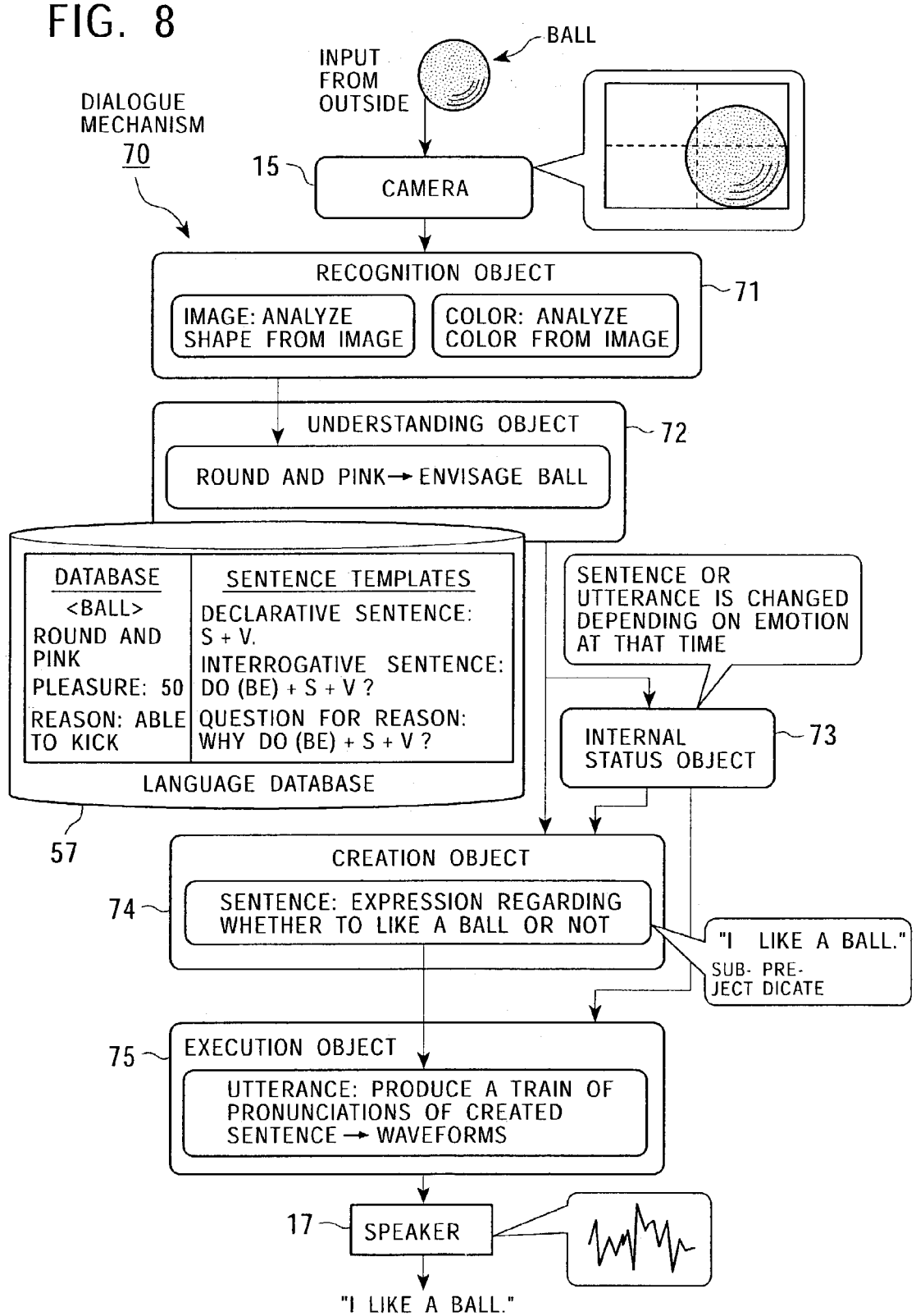

ROBOT DEVICE WITH CHANGING DIALOGUE AND CONTROL METHOD THEREFOR AND STORAGE MEDIUM

TECHNICAL FIELD

The present invention relates to a dialogue device and method and a storage medium product for use with a walking robot device or a multi-articulated robot, which operates in response to commands from users and/or ambient environments, or with animation characters, etc. operated based on computer graphics (CG) (i.e., with a robot device or the like). More particularly, the present invention relates to a robot device, a control method for the robot device, and a storage medium product, the robot device being capable of creating sentences, uttering the sentences and communicating with users through conversations.

Stated otherwise more exactly, the present invention relates to a robot device capable of creating and uttering sentences depending on emotions of the robot device or the like, a control method for the robot device, and a storage medium product. In particular, the present invention relates to a robot device capable of creating and uttering sentences depending on internal statuses of the robot device or the like, thereby expressing the internal status, a control method for the robot device, and a storage medium product.

BACKGROUND ART

Hitherto, a variety of ideas have been proposed and developed on a walking robot device or a multi-articulated robot, which operates in response to commands from users and/or ambient environments, or on animation characters, etc. operated based on computer graphics (CG). Those robot devices or animation characters (hereinafter referred to also as a "robot device or the like" collectively) perform a series of actions in response to commands issued from users.

For example, a robot device having the shape and structure designed in imitation of a four-footed walking animal such as a dog, i.e., the so-called "pet robot", lies sprawled in response to a command (e.g., voice input) "Lie down!" from a user, or raises its paw to "shake hands" when the user puts a hand in front of the robot mouth.

Such a robot device or the like designed in imitation of actual animals, including a dog and a human being, are desirably capable of behaving in a manner as close as possible to actions and emotional expressions of genuine animals. It is also desired that the robot device or the like is able to not only perform just predetermined actions in response to commands from users and/or external environments, but also behave autonomously like genuine animals. This is because users get tired easily if the robot device or the like repeatedly performs the same actions far away from actual situations, and the ultimate purpose of development of the robot device or the like, i.e., cohabitation with human beings under the same living environments, cannot be achieved.

Recent intelligent robot devices or the likes incorporate therein the functions of voice input/output, voice recognition, voice synthesis, etc., and are able to converse or dialogue with users on the voice basis. In the case of performing the conversation or utterance, it is similarly desired that the robot devices or the likes are able to not only perform just predetermined actions in response to commands from users and/or external environments, but also behave autonomously like genuine animals.

Prior conversation utterance systems are proposed in, e.g., Japanese Unexamined Patent Application Publication Nos. 10-247194, 8-339446 and 9-16800.

Japanese Unexamined Patent Application Publication No. 10-247194 discloses an automatic interpreting device in which translation is performed and voices are synthesized while holding consistency as the whole of a sentence by searching for an appropriate example regarding a difference in the sentence, e.g., an erroneous utterance intent of a translated part. Also, Japanese Unexamined Patent Application Publication No. 8-339446 discloses a dialogue device in which a variety of emotions of a user are detected and information corresponding to the detected emotion is issued from the computer side so that the user can feel friendlier toward the device. Further, Japanese Unexamined Patent Application Publication No. 9-16800 discloses a voice dialogue system with a face image, which is easily adaptable for changes in speech theme and is capable of providing practical and natural dialogues with users.

However, those prior conversation utterance systems are basically intended to recognize voices of speakers or users, to extract emotions from facial expressions, and to create sentences in match with the emotions of the speakers only along the topics presented from the speakers.

Also, the voice dialogue system with a face image, disclosed in Japanese Unexamined Patent Application Publication No. 9-16800, is a system in which contents of replies corresponding to utterances are defined in the form of a table beforehand. This is hence no more than that replies and corresponding emotions are decided beforehand, although the contents of replies include emotional information.

An intelligent robot device or the like has its internal statuses including emotions, etc. and is able to realize communication with users at a deeper level by outputting the internal statuses to the outside.

In conventional robot devices or the likes, however, means for expressing internal statuses are restricted to only actions of four legs, etc., and expressions cannot be easily recognized by everyone at a glance.

DISCLOSURE OF INVENTION

It is an object of the present invention to provide a superior robot device, a control method for the robot device, and a storage medium product, which are applicable to robot devices or the likes, such as a walking robot device or a multi-articulated robot, which operates in response to commands from users and/or ambient environments, or animation characters, etc. operated based on computer graphics (CG).

Another object of the present invention is to provide a superior robot device capable of creating and uttering sentences depending on emotions of the robot device or the like, a control method for the robot device, and a storage medium product.

Still another object of the present invention is to provide a superior robot device capable of creating and uttering sentences depending on internal statuses of the robot device or the like, thereby expressing the internal statuses, a control method for the robot device, and a storage medium product.

The present invention has been accomplished with the view of achieving the above objects, and according to a first aspect thereof, there is provided a robot device having the function of dialoguing with users or a control method for the robot device, comprising:

external status input means or step for inputting an external status;

internal status managing means or step for managing an internal status; and dialogue control means or step for reflecting a change of the internal status upon a dialogue with a user.

With the robot device or the control method for the robot device according to the first aspect of the present invention, the robot device or the like can recognize an external status, change an internal status, such as an emotion, and reflect a change of the internal status upon a dialogue. The internal status is not associated with a sentence, but it exists independently of the system and is always varied depending on various external inputs and internal changes of the system.

Therefore, even when the same question is made on the robot device or the like, the contents of a reply are changed depending on the internal status at that time, and a manner of providing a reply also differs depending on the internal status. Thus, the robot device or the like can express its internal statuses using words.

As a result, anyone is able to easily confirm the internal status of the robot device or the like. For example, anyone is able to understand a liking of the robot or to make deeper communication with the robot. It is also possible to enlarge the extent of dialogues between human beings and the robot device or the like, to increase familiarity therebetween, and to facilitate empathy so that users feel more familiar with the robot device or the like. Consequently, cohabitation between human beings and the robot device or the like can be realized with more ease.

Further, the robot device or the like can express, using words, emotions varying upon interaction with the real world. Accordingly, a robot device or the like being more easily understandable and more familiar with everyone can be designed and manufactured. It is hence possible to enhance amusingness and entertainingness of the robot device or the like.

Moreover, since sentences are uttered depending on internal statuses, the robot device or the like is able to create a sentence in response to not only an external stimulus, i.e., a question from the user, but also various internal stimuli or internal statuses.

In addition, the present invention can also be implemented as one variation such that factors for changes of the internal status are reflected upon the sentences. Additionally, sentences reflecting the internal statuses and sentences explaining the internal statuses can also be created on the basis of information regarding verbs and adjectives as well as pronouns.

According to a second aspect of the present invention, there is provided a robot device having the function of dialoguing with users or a control method for the robot device, comprising:

external status input means or step for inputting an external status;

external status recognizing means or step for recognizing the inputted external status;

external status understanding means or step for understanding a meaning and implications of the recognized external status in the sentence form;

internal status managing means or step for managing an internal status;

dialogue sentence creating means or step for creating a dialogue sentence based on a recognized result of the external status in comparison with the internal status; and output means or step for externally outputting the created dialogue sentence.

With the robot device or the control method for the robot device according to the second aspect of the present invention, the robot device or the like can recognize an external status, change an internal status, such as an emotion, and reflect a change of the internal status upon a dialogue. The internal status is not associated with a sentence, but it exists independently of the system and is always varied depending on various external inputs and internal changes of the system.

Therefore, even when the same question is made on the robot device or the like, the contents of a reply are changed depending on the internal status at that time, and a manner of providing a reply also differs depending on the internal status. Thus, the robot device or the like can express its internal statuses using words.

In this connection, the internal status is constituted, for example, as an emotion of the robot device. Then, the internal status managing means or step changes the internal status in response to a change of the external status.

Also, the robot device or the like may further include a database in which results obtained by classifying external statuses are stored along with internal statuses. In that case, the dialogue sentence creating means or step can create a dialogue sentence using the database.

Moreover, the robot device or the control method for the robot device may further comprise action/behavior creating means or step for creating an action or a behavior of a robot body based on the recognized result of the external status in comparison with the internal status; and robot body control means or step for realizing the created action or behavior of the robot body. In that case, the robot device or the like is able to express a change of the internal status by using not only a dialogue but also an action of the robot body.

According to a third aspect of the present invention, there is provided a dialogue device for dialoguing with users or a dialog control method, comprising:

external status input means or step for inputting an external status;

internal status managing means or step for managing an internal status; and dialogue control means or step for reflecting a change of the internal status upon a dialogue with a user.

With the dialogue device or the dialog control method according to the third aspect of the present invention, the dialogue device can recognize an external status, change an internal status, such as an emotion, and reflect a change of the internal status upon a dialogue. The internal status is not associated with a sentence, but it exists independently of the system and is always varied depending on various external inputs and internal changes of the system.

Therefore, even when the same question is made on the dialogue device, the contents of a reply are changed depending on the internal status at that time, and a manner of providing a reply also differs depending on the internal status. Thus, the dialogue device can express its internal statuses under use.

According to a fourth aspect of the present invention, there is provided a dialogue device for dialoguing with users or a dialog control method, comprising:

external status input means or step for inputting an external status;

external status recognizing means or step for recognizing the inputted external status;

external status understanding means or step for understanding a meaning and implications of the recognized external status in the sentence form;

internal status managing means or step for managing an internal status;

dialogue sentence creating means or step for creating a dialogue sentence based on a recognized result of the external status in comparison with the internal status; and output means or step for externally outputting the created dialogue sentence.

With the dialogue device or the dialog control method according to the fourth aspect of the present invention, the dialogue device can recognize an external status, change an internal status, such as an emotion, and reflect a change of the internal status upon a dialogue. The internal status is not associated with a sentence, but it exists independently of the system and is always varied depending on various external inputs and internal changes of the system.

Therefore, even when the same question is made on the dialogue device, the contents of a reply are changed depending on the internal status at that time, and a manner of providing a reply also differs depending on the internal status. Thus, the dialogue device can express its internal statuses under use.

In this connection, the internal status managing means or step may change the internal status in response to a change of the external status.

Also, the dialogue device may include a database in which results obtained by classifying external statuses are stored along with internal statuses. In that case, the dialogue sentence creating means or step can create a dialogue sentence using information stored in the database.

According to a fifth aspect of the present invention, there is provided a storage medium product physically storing, in the computer readable form, computer software described so as to execute, on a computer system, control of a robot device having the function of dialoguing with users, the computer software comprising the steps of:

an external status input step of inputting an external status;

an external status recognizing step of recognizing the inputted external status;

an external status understanding step of understanding a meaning and implications of the recognized external status in the sentence form;

an internal status managing step of managing an internal status;

a dialogue sentence creating step of creating a dialogue sentence based on a recognized result of the external status in comparison with the internal status; and an output step of externally outputting the created dialogue sentence.

According to a sixth aspect of the present invention, there is provided a storage medium product physically storing, in the computer readable form, computer software described so as to execute a dialogue process with users on a computer system, the computer software comprising the steps of:

an external status input step of inputting an external status;

an external status recognizing step of recognizing the inputted external status;

an external status understanding step of understanding a meaning and implications of the recognized external status in the sentence form;

an internal status managing step of managing an internal status;

a dialogue sentence creating step of creating a dialogue sentence based on a recognized result of the external status in comparison with the internal status; and an output step of externally outputting the created dialogue sentence.

The storage medium products according to the fifth and sixth aspects of the present invention are each a medium product for providing, in the computer readable form, computer software to, for example, a universal computer system capable of executing various program codes. That medium product is in the form of a storage medium, such as a CD (Compact Disc), an FD (Flexible Disc) or an MO (Magneto-Optical Disc), which can be carried with users and detachably attached to the system. Alternatively, it is technically possible to provide the computer software to a particular computer system via a transmission medium, such as a network (regardless of whether the network is wireless or wired).

The storage medium product defines the structural or functional cooperative relationship between the computer software and the storage medium for realizing the predetermined functions of the computer software on the computer system. In other words, by installing the predetermined computer software in the computer system with the aid of the storage medium products according to the fifth and sixth aspects of the present invention, the cooperative actions are developed on the computer system so as to provide similar operations and advantages to those obtainable with the robot device and the control method for the robot device according to the second aspect of the present invention and with the robot device and the control method for the robot device according to the fourth aspect of the present invention.

Still other objects, features and advantages of the present invention will be apparent upon reading a detailed description given below in connection with an embodiment of the present invention and the accompanying drawings.

BRIEF DESCRIPTION OF THE DRAWINGS

FIG. 8 is a chart showing one example of the operation of the dialogue mechanism 70 executed when the locomotion robot 1 recognizes an object and then speaks.

BEST MODE FOR CARRYING OUT THE INVENTION

An embodiment of the present invention will be described below in detail with reference to the drawings.

Figure 1:
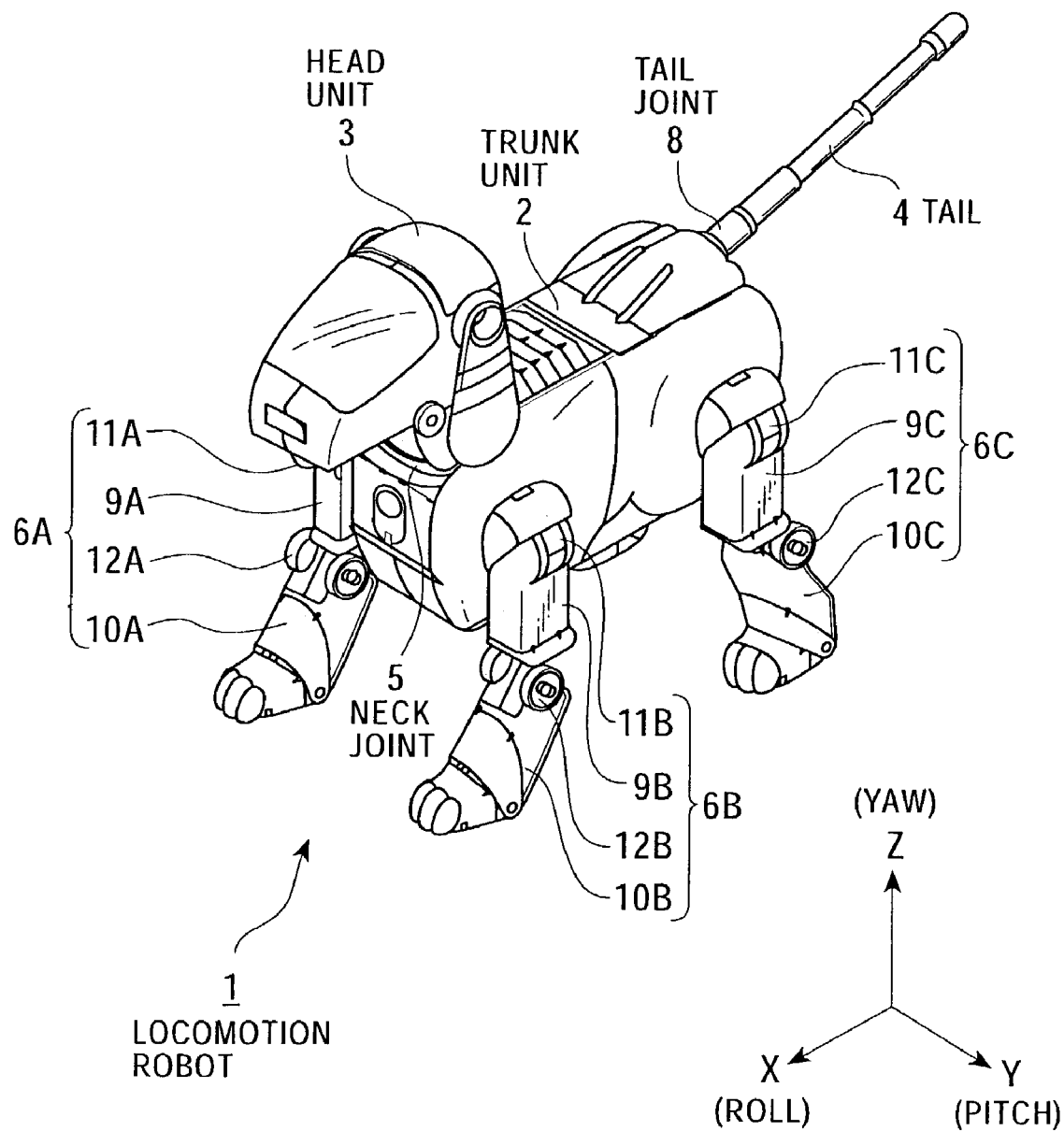
FIG. 1 is a view showing an external appearance of a locomotion robot 1 walking with four legs, in which the present invention is embodied.

FIG. 1 shows an external appearance of a locomotion robot 1 walking with four legs, in which the present invention is embodied. A shown, the locomotion robot 1 is a multi-articulated locomotion robot modeled on the shape and structure of a four-legged animal. In particular, the locomotion robot 1 of this embodiment is a pet robot designed in imitation of the shape and structure of a dog as a typical example of pet animals, and is able to not only cohabit with human beings under human living environments, for example, but also express actions in response to user operations.

The locomotion robot 1 comprises a trunk unit 2, a head unit 3, a tail 4, and four legs, i.e., leg units 6A-6D.

The trunk unit 2 accommodates a control unit (not shown in FIG. 1 and described later) for controlling the operation of a robot body in a supervising manner, and a battery 21 (not shown in FIG. 1) serving as a main power source for the robot body.

The head unit 3 is disposed substantially at an upper front end of the trunk unit 2 through a neck joint 7 having degrees of freedom in directions of roll, pitch and yaw axes (as shown). Also, the head unit 3 incorporates therein an image recognizing unit 15 corresponding to "eyes" of a dog, such as a CCD (Charge Coupled Device) camera, a microphone 16 corresponding to "ears", a speaker 17 corresponding to a "mouth", a touch sensor 18 corresponding to a tactile sense, a plurality of LED indicators 19, and a remote controller receiving unit 20 for receiving commands transmitted from a user through a remote controller (not shown). In addition, the head unit 3 may further include sensors constituting five senses of a living body.

The tail 4 is attached to substantially an upper rear end of the trunk unit 2 in a bendable or rotatable manner through a tail joint 8 having degrees of freedom in directions of roll and pitch axes.

The leg units 6A and 6B constitute forelegs, and the leg units 6C and 6D constitute hind legs. The leg units 6A-6D are constituted as combinations of thigh units 9A-9D and shank units 10A-10D, respectively, and are attached to four corners of the underside of the trunk unit 2 at front and rear ends on both left and right sides. The thigh units 9A-9D are coupled to the corresponding predetermined positions of the trunk unit 2 through crotch joints 11A-11D each having degrees of freedom in directions of roll, pitch and yaw axes. Also, the thigh units 9A-9D and the shank units 10A-10D are coupled to each other through knee joints 12A-12D each having degrees of freedom in directions of roll and pitch axes.

In the legged locomotion robot 1 constructed as shown, by driving respective joint actuators in accordance with commands from the later-described control unit, the robot is able to perform actions such as swinging the head unit 3 vertically or horizontally, waving the tail 4, and walking or running through synchronous cooperative driving of the foot units 6A-6D.

Degrees of freedom in movement of each joint of the locomotion robot 1 are in fact realized by rotating a joint actuator (not shown) provided for each axis. The number of degrees of freedom in movement of each joint of the locomotion robot 1 is a matter of choice in design and should not be construed as limiting the gist of the present invention.

Figure 2:
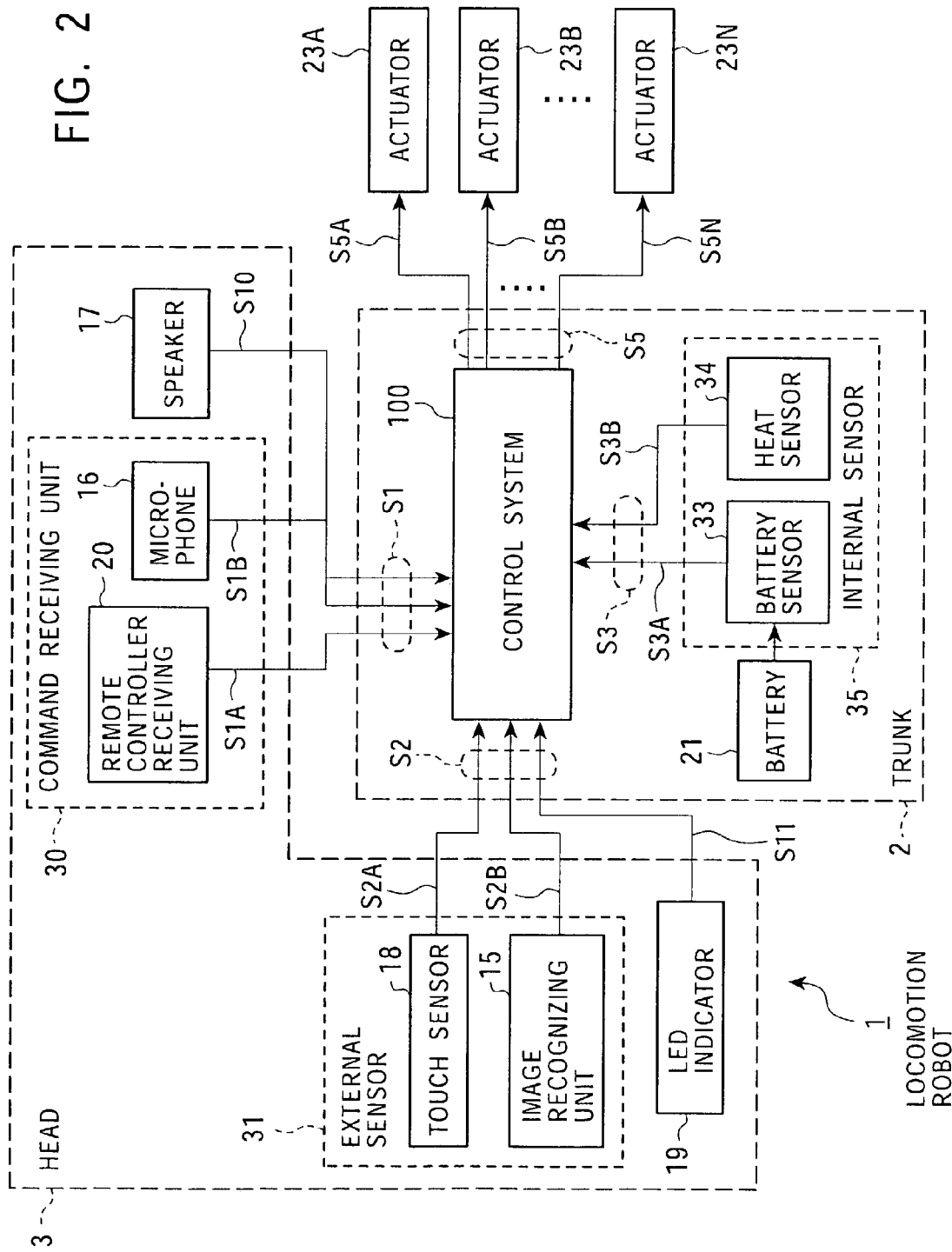
FIG. 2 is a block diagram schematically showing a hardware configuration of a control unit for controlling the operation of the locomotion robot 1.

FIG. 2 schematically shows a hardware configuration of a control unit for controlling the operation of the locomotion robot 1.

The head 3 includes a command receiving unit 30 made up of the microphone 16 and the remote controller receiving unit 20, external sensors 31 including the image recognizing unit 15 and the touch sensor 18, the speaker 17, and the LED indicators 19.

The trunk unit 2 accommodates the battery 21 serving as a main power source, the controller 32 for controlling the overall operation of the locomotion robot 1 in a supervising manner, and internal sensors 35 including a battery sensor 33 for detecting the remaining capacity of the battery 21 and a heat sensor 34 for detecting the heat generated inside the robot body.

Further, a plurality of actuators 23A-23N are disposed in respective portions (e.g., driven joint portions) of the locomotion robot 1.

The command receiving unit 30 is made up of the remote controller receiving unit 20 and the microphone 16, and is able to commands, e.g., "Walk!", "Lie down!", and "After ball!", which are given to the locomotion robot 1 from the user.

The remote controller receiving unit 20 receives commands inputted from a remote controller (not shown) with user operations, produces a reception signal S1A, and sends it to the controller 32. Those commands from the remote controller are transferred using, for example, the technique of near-range wireless data communication such as infrared data communication (IrDA), Bluetooth or IEEE802.11b.

When the user utters voices corresponding to any desired command, the microphone 16 collects the voices, produces a voice signal S1B, and sends it to the controller 32.

The touch sensor 18 as one of the external sensors 31 detects actions, such as "stroking" and "hitting", imposed on the locomotion robot 1 from the user. When the user imposes a desired action, for example, by touching the touch sensor 18, the touch sensor 18 produces a corresponding touch detection signal S2A, and sends it to the controller 32.

The image recognizing unit 15 as another one of the external sensors 31 detects ambient environmental information, such as "dark" and "there is a favorite toy", as a result of recognizing environments around the locomotion robot 1, or detects movements of other locomotion robots, such as "another robot is running". The image recognizing unit 15 sends, to the controller 32, an image signal S2B obtained as a result of picking up an image of the surroundings.

The, internal sensors 35 detect internal statuses of the locomotion robot 1 itself, such as "feel hungry", which means lowering of the remaining capacity of the battery, and "have a fever". The battery sensor 33 and the heat sensor 34 are included in the internal sensors 35.

The battery sensor 33 detects the remaining capacity of the battery 21 serving as a main power source of the robot body, and sends a resulting battery capacity detection signal S3A to the controller 32. Also, the heat sensor 34 detects the heat generated inside the robot body, and sends a resulting heat detection signal S3B to the controller 32.

In accordance with command signals S1 supplied from the command receiving unit 30, external information signals S2 supplied from the external sensors 31, and internal information signals S3 supplied from the internal sensors 35, the controller 32 produces control signals S5A-S5N for driving the actuators 23A-23N and sends them to the actuators 23A-23N, respectively, thereby controlling the operation of the robot body in a supervising manner.

On that occasion, the controller 32 produces, as required, a voice signal S10 and a luminous signal S11 which are outputted to the outside. The voice signal S10 is outputted to the outside through the speaker 17, and the luminous signal S11 is sent to the LED indicators 19 for issuing a desired luminous output (such as blinking or change in color) so that information representing, e.g., the internal status of the robot body can be fed back to the user. The user can be notified of, for example, the emotion of the locomotion robot 1 with the luminous output. Instead of the LED indicators 19, an image display (not shown) for displaying an image may be provided. This enables the locomotion robot to present information regarding its own emotion, etc. to the user more exactly and closely through a desired image displayed on the display.

Control of the robot body by the controller 32 will be described below.

Figure 3:
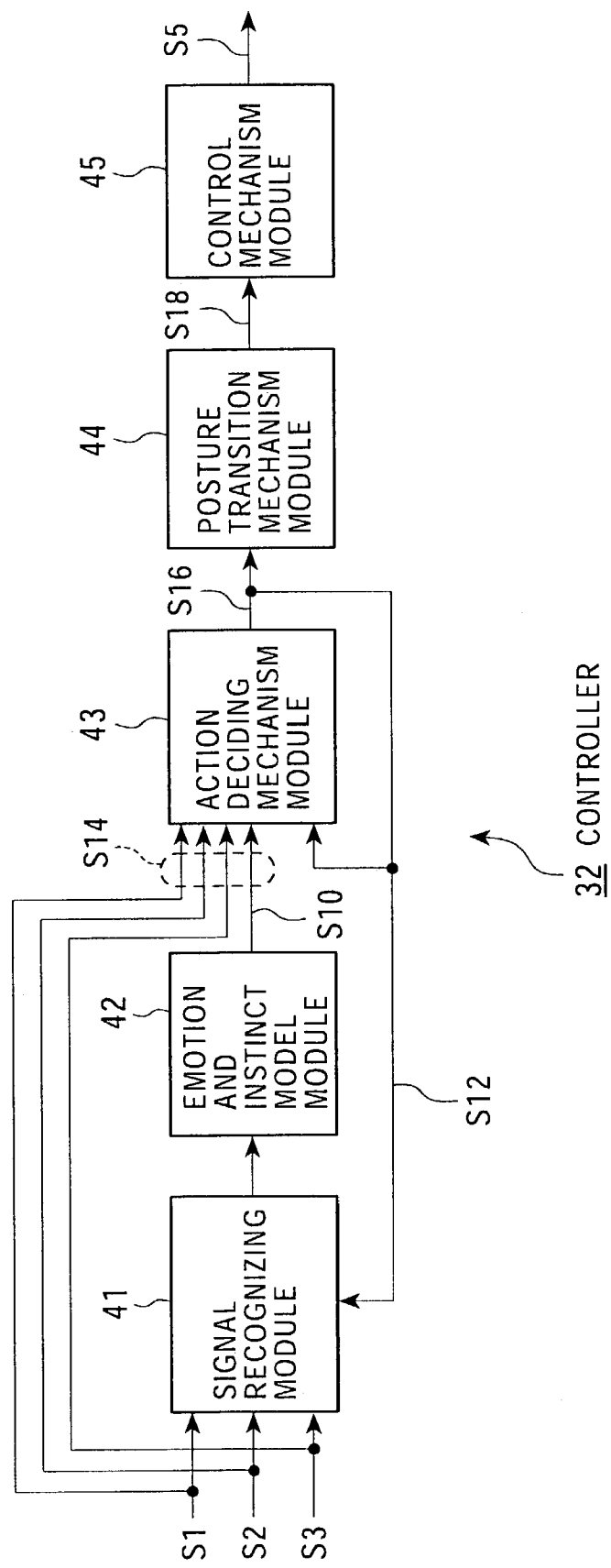
FIG. 3 is a block diagram schematically showing a functional configuration of a controller 32.

FIG. 3 schematically shows a functional configuration of the controller 32. As shown in FIG. 3, the controller 32 comprises various modules, i.e., a signal recognizing module 41, an emotion and instinct model module 42, an action deciding mechanism module 43, a posture transition mechanism module 44, and a control mechanism module 45. These modules can be in practice realized with software processing carried out on a computer through execution of predetermined program code.

Figure 4:
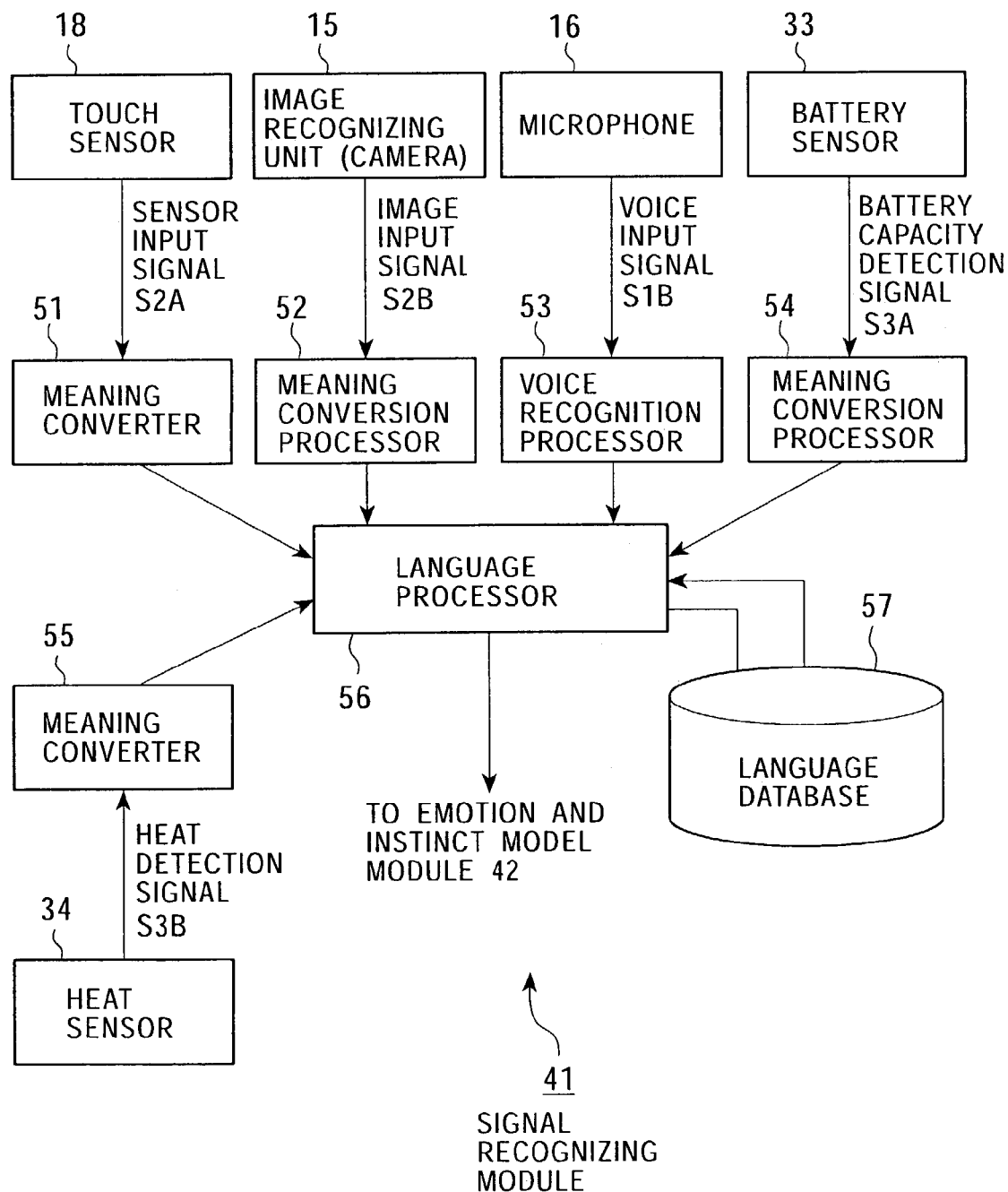
FIG. 4 is a block diagram schematically showing a functional configuration of a signal recognizing unit 41.

The signal recognizing module 41 executes processing to recognize and understand various input signals representing the internal statuses and the external environments. FIG. 4 schematically shows a functional configuration of the signal recognizing unit 41. A following description is made of the functions of the signal recognizing module 41 with reference to FIG. 4.

The touch sensor 18 comprises, e.g., contact sensors and pressure sensitive sensors which are dispersedly arranged over the whole of the locomotion robot 1. For example, when the user applies an external force, which implies "stroking" or "hitting", to the locomotion robot 1, a resulting sensor input signal S2A is supplied to a meaning converter 52. The meaning conversion processor 51 interprets or infers the meaning and implications involved in the user operation, such as "stroking" or "hitting", and outputs an obtained result to a language processor 56 as meaning converted data in the text form.

The image recognizing unit 15 is constituted as an image pickup device, e.g., a CCD (Charge Coupled Device). An image input signal S2B produced upon capturing, for example, actions and behaviors (including gestures) of the user is supplied to a meaning conversion processor 52. The meaning conversion processor 56 interprets or infers the meaning and implications involved in the actions and behaviors of the user, and outputs an obtained result to the language processor 56 as meaning converted data in the text form. Also, when entering, as an image, visual identifying information (such as "cyber codes" and landmarks) that has the meaning defined in the language form beforehand, the meaning conversion processor 52 is able to execute meaning conversion processing uniquely corresponding to the result of image recognition.

A voice input signal S1B from the microphone 16 is produced from the head. A voice recognition processor 53 recognizes, as a text, voices of the user inputted through the voice input unit 53 and outputs it to the language processor 56.

The battery sensor 33 detects the remaining capacity of the battery 21 serving as a main power source of the robot body, and a resulting battery capacity detection signal S3A is supplied to a meaning conversion processor 54. The meaning conversion processor 54 interprets or infers the meaning and implications involved in the remaining capacity of the battery 21, such as "feel hungry", and outputs an obtained result to the language processor 56 as meaning converted data in the text form.

The heat sensor 34 detects the heat generated inside the robot body, and a resulting heat detection signal S3B is supplied to a meaning conversion processor 55. The meaning conversion processor 55 interprets or infers the meaning and implications involved in the detected heat of the robot body, such as "have a fever", and outputs an obtained result to the language processor 56 as meaning converted data in the text form.

The language processor 56 analyzes the meaning and implications involved in the inputted results from the external sensors 31, the internal sensors 35, etc. while utilizing a language database 57, and understands the inputted results in the language or sentence form. Also, the language processor 56 sends recognized results of input information from the external sensors 31, the internal sensors 35, etc. to the emotion and instinct model module 42 in the sentence or another form.

The language database 57 accumulates, in the form of a database, the matters that can be recognized or expressed by the locomotion robot 1. In this embodiment, as described later, the language database 57 manages a database containing results obtained through classification of external statuses along with emotions. The contents stored in the language database 57 are updated with experiences and learning.

The language processor 56 processes pleasure/unpleasure and related implications in the locomotion robot 1 regarding the recognizable or expressible matters while referring to the language database 57. Also, the language processor 56 creates a sentence having the contents of a matched sentence through comparison of the recognizable or expressible matters and words decomposed based on the implications. The created sentence is expressed through an output device, e.g., the speaker 17.

Returning now to FIG. 3 again, the control by the controller 32 will be described below. The emotion and instinct model module 42 handles in the form of models the emotions and instincts constituting the internal statuses of the locomotion robot 1, and modifies emotion models and instinct models depending on changes of environments inside and outside the robot body, which are detected through the signal recognizing unit 41.

The action deciding mechanism module 43 decides a next action (behavior), which is to be executed by the locomotion robot 1, in accordance with not only the command signal S1, the external information signal S2, and the internal information signal S3, but also an emotion and instinct status information S10 obtained from the emotion and instinct model module 42.

The posture transition mechanism module 44 plans a posture transition schedule for transition to the next action (behavior) decided by the action deciding mechanism module 43. Additionally, information regarding the action (behavior) decided by the action deciding mechanism module 43 is fed back to the emotion and instinct model module 42 so that the emotion and instinct model module 42 can decide the status of emotion or instinct with reference to the action (behavior) having been decided.

In accordance with posture transition information S18 sent from the posture transition mechanism module 44 based on the posture transition schedule, the control mechanism module 45 controls the operations of respective driving units, such as the actuators 23A-23N, and then actually transits the posture for executing the next action (behavior) decided by the action deciding mechanism module 43.

Figure 5:
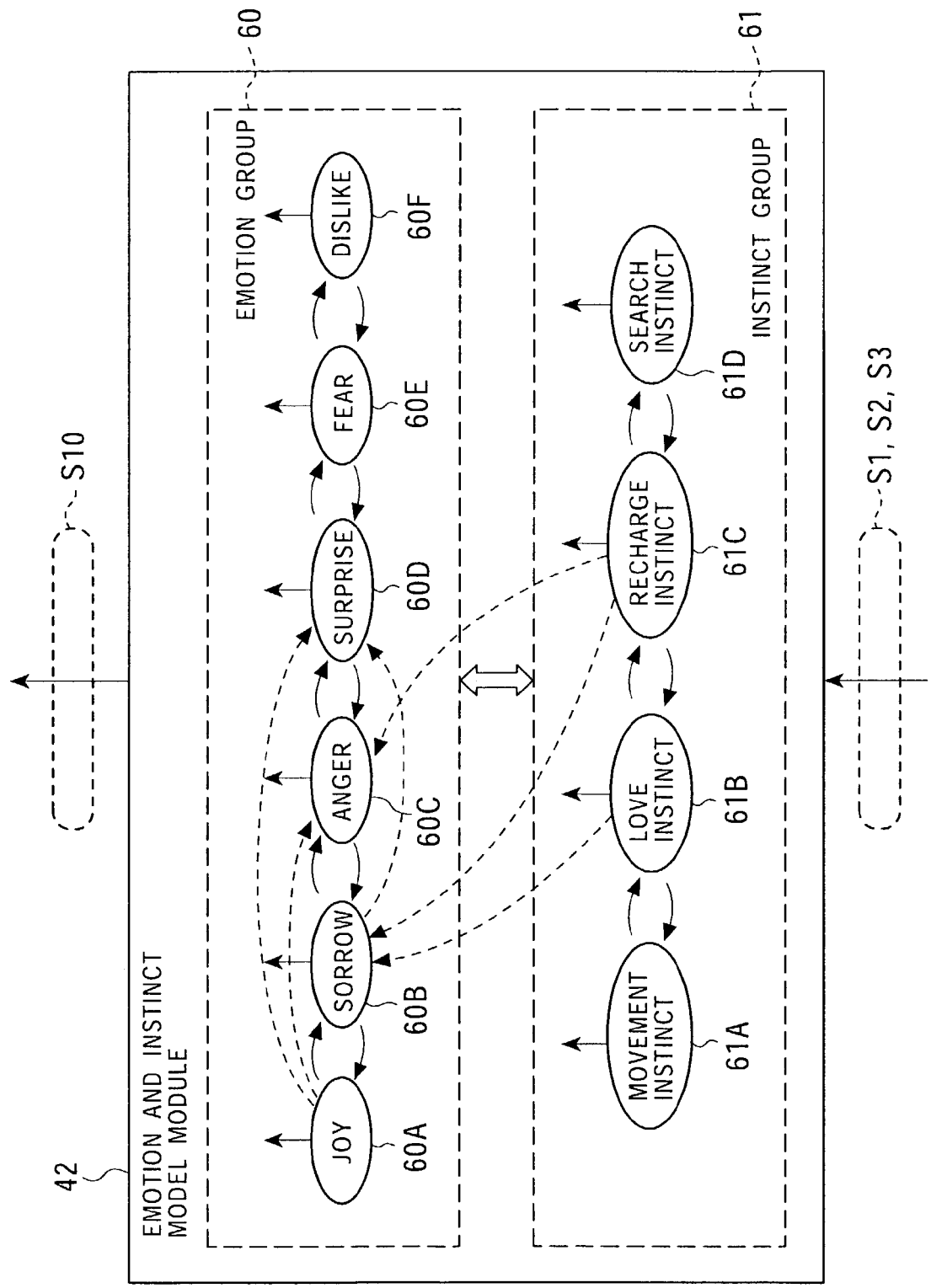
FIG. 5 is a block diagram schematically showing a functional configuration of an emotion and instinct model module 42.

FIG. 5 schematically shows a functional configuration of the emotion and instinct model module 42. As shown in FIG. 5, the emotion and instinct model module 42 is mainly divided into an emotion group 60 constituting emotion models, and a desire group 61 constituting instinct models prepared as models having different attributes from those of the emotion models.

Herein, the emotion models are each a model constituted with an emotion parameter having a certain value to express one of the emotions specified for the locomotion robot 1 through an action depending on the value of the emotion parameter. The value of the emotion parameter is varied up and down primarily in accordance with an external input signal (external factor) corresponding to a situation, such as being "hit" or "scolded", which is detected by a sensor, e.g., a pressure sensor or a visual sensor. Of course, the emotion parameter is also changed in accordance with an internal input signal (internal factor) representing the remaining capacity of the battery or the temperature inside the robot body.

The instinct models are each a model constituted with an instinct parameter having a certain value to express one of the instincts (desires) specified for the locomotion robot 1 through an action depending on the value of the instinct parameter. The value of the instinct parameter is varied up and down primarily in accordance with an internal input signal representing a desire for, e.g., "doing exercises" based on action history or "recharging (being hungry)" based on the remaining capacity of the battery. Of course, the instinct parameter is also changed in accordance with an external input signal (external factor) similarly to the emotion parameter.

Those groups of emotion models and instinct models are each made up of plural kinds of models having the same attributes. More specifically, the emotion group 60 includes emotion units 60A-60F as independent emotion models having the same attributes, and the desire group 61 includes desire units 61A-61D as independent desire models having the same attributes.

The emotion group 60 includes, for example, an emotion unit 60A representing "joy", an emotion unit 60B representing "sorrow", an emotion unit 60C representing "anger", an emotion unit 60D representing "surprise", an emotion unit 60E representing "fear", and an emotion unit 60F representing "dislike". Also, the desire group 61 includes, for example, a desire unit 61A representing a "movement instinct", a desire unit 61B representing a "love instinct", a desire unit 61C representing a "recharge instinct", and a desire unit 61D representing a "search instinct".

Each of the emotion units 60A-60F indicates the degree of emotion using the intensity of, for example, 0 to 100 levels (i.e., values of the emotion parameter), and changes the intensity of emotion moment by moment in accordance with the command signal S1, the external information signal S2, and the internal information signal S3 supplied to the corresponding one. Thus, the emotion and instinct model module 42 combines the intensities of the emotion units 60A-60F varying moment by moment with each other, thereby expressing the emotional state of the locomotion robot 1 and modeling emotion changes with time.

Further, desired ones of the emotion units influence with each other so as to vary their intensities. For example, the emotion units are coupled in a mutually suppressing manner or a mutually stimulating manner so that the intensities of the emotion units are varied upon a mutual influence between them.

The locomotion robot 1 according to this embodiment can recognize the external status on the sentence basis, and can produce the emotion based on the internal status, thus enabling emotion changes to be reflected upon the dialogue with the user. The internal status referred to in this embodiment is not associated with a sentence, but it exists independently of the system and is always varied depending on various external inputs and internal changes of the system.

In other words, since the locomotion robot 1 performs an expressing operation such as uttering a sentence depending on its own internal status, the locomotion robot is able to create a sentence in response to not only an external stimulus, i.e., a question from the user, but also various internal stimuli or internal statuses, and to orally express the created sentence in the form of dialogue with the user. Accordingly, even when the same question is made on a robot device or the like, the contents of a reply are changed depending on the internal status at that time, and a manner of providing a reply also differs depending on the internal status.

Figure 6:
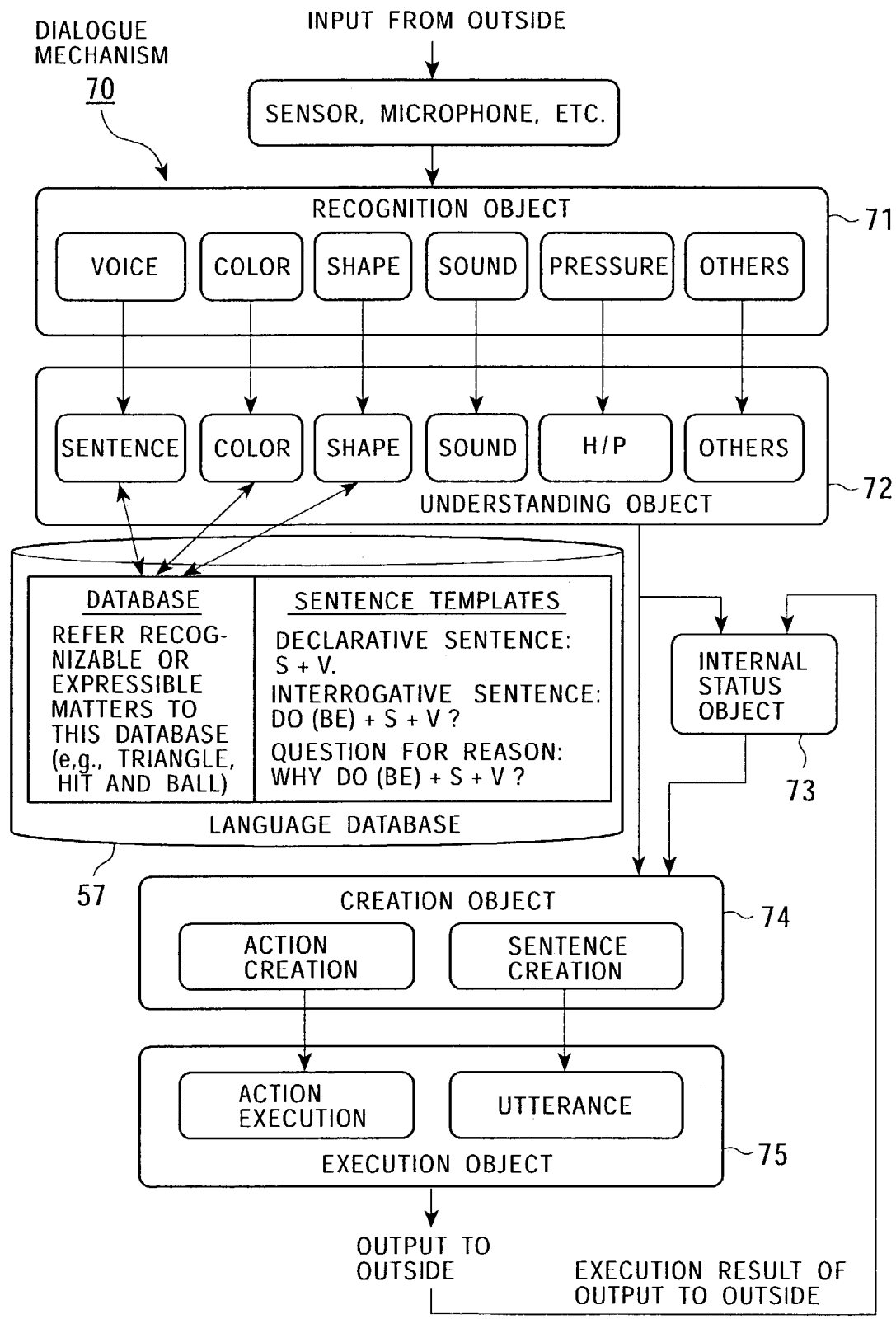
FIG. 6 is a chart schematically showing a dialogue mechanism 70 in the locomotion robot 1 according to the embodiment.

FIG. 6 schematically shows a dialogue mechanism 70 provided on the locomotion robot 1 according to this embodiment. As shown in FIG. 6, the dialogue mechanism 70 is made up of a recognition object 71, an understanding object 72, the language database 57, an internal status object 73, a creation object 74, and an execution object 75.

The recognition object 71 takes inputs from hardware, such as the microphone 16 and the touch sensor 18, into the system in the recognizable form.

The understanding object 72 gives meaning to the form taken in by the recognition object 71. For example, the understanding object 72 gives the meaning of "HIT" to a pressure 80 or the meaning of "triangle" to the presence of three angles.

The understanding object 72 refers to the language database 57 and searches for a corresponding one of the recognizable or expressible matters from the language database 57. The language database 57 accumulates, in the form of a database, the matters that can be recognized or expressed by the locomotion robot 1. Preferably, the language database 57 manages a database containing results obtained through classification of external statuses along with emotions. Pleasure/unpleasure and related implications in the locomotion robot 1 regarding each of the recognizable or expressible matters are also processed while referring to the language database 57. The language database 57 is updated with experiences and learning. Also, the language database 57 includes sentence templates and is able to create a sentence having the contents of a matched sentence through comparison of the recognizable or expressible matters and words decomposed based on the implications.

The recognition object 71, the understanding object 72, and the language database 57 are constituted in the signal recognizing unit 41 (see FIG. 3).

The internal status object 73 is constituted, for example, by the emotion and instinct model module 42 (see FIG. 3), and changes the internal status of the locomotion robot 1 in accordance with the implication provided by the understanding object.

The creation object 74 is constituted by the action deciding mechanism module 43 (see FIG. 3), and decides a next action (behavior) of the locomotion robot 1 in accordance with outputs of the understanding object 72 and the internal status object 73. In this embodiment, the creation object 74 creates the next action in the form of a behavior expressed with body actions and a sentence.

The execution object 75 executes an object created by the creation object 74 and outputs the created object to the outside. When the created object is an action, it is executed with operations of the robot body through driving of the actuators 23A-23N. When the created object is a sentence, it is executed with utterance through the speaker 17. The execution object is constituted by the posture transition mechanism module 44 and the control mechanism module 45 (see FIG. 3).

Further, the result of execution of the external output by the execution object 75 is fed back to the internal status object 73 for changing the internal status.

Examples of the operation of the dialogue mechanism 70 in the locomotion robot 1 will be described below.

Figure 7:
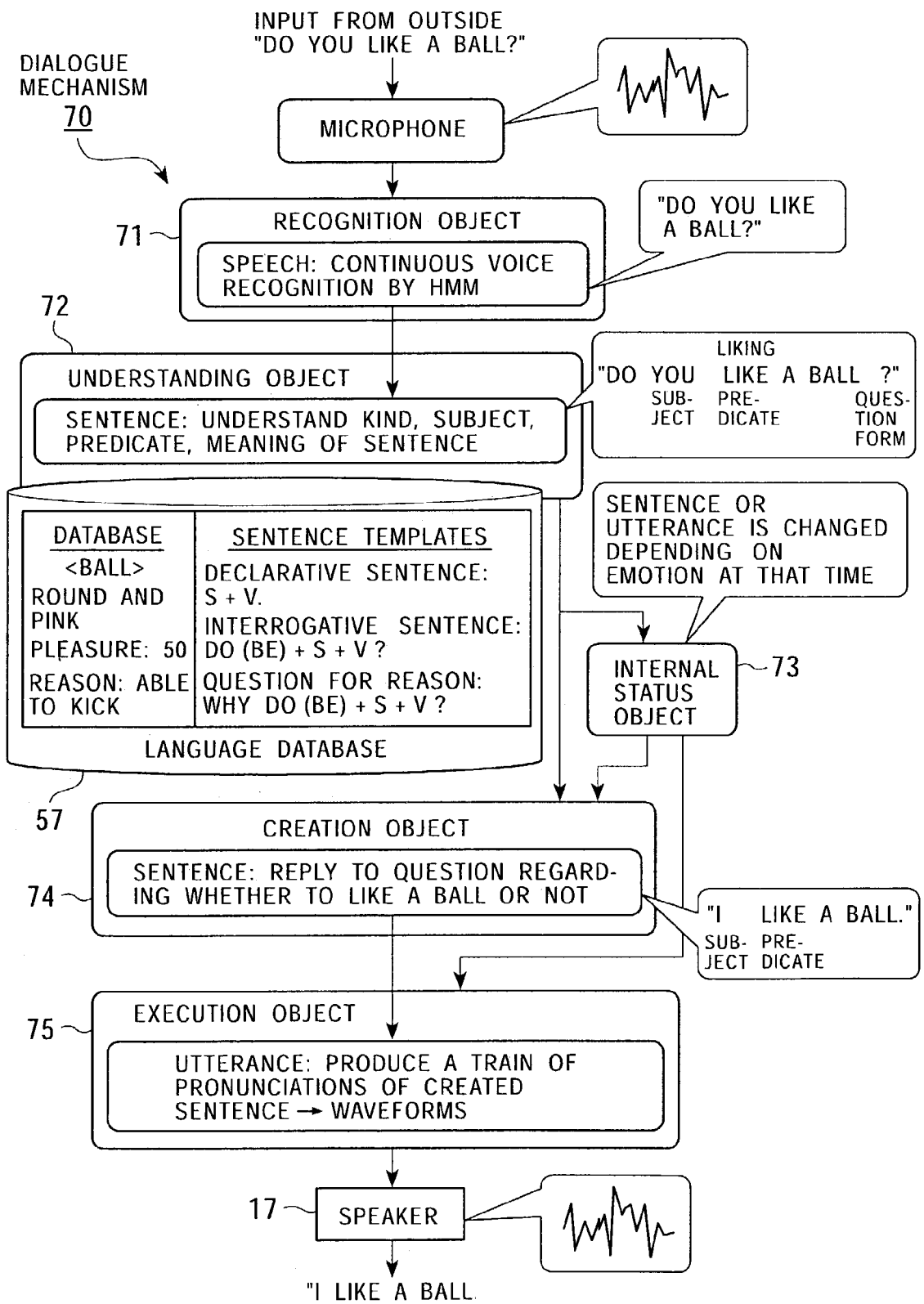
FIG. 7 is a chart showing one example of the operation of the dialogue mechanism 70 executed when the locomotion robot 1 is asked from a user and replies responsively.

FIG. 7 is a chart showing one example of the operation of the dialogue mechanism 70 executed when the locomotion robot 1 is asked from a user and replies responsively.

The locomotion robot 1 includes a database storing recognizable and expressible matters. When the user asks to the locomotion robot 1, "Do you like a ball?", the locomotion robot 1 collects the uttered human words with the microphone 16, performs voice recognition in the recognition object 71 based on the HMM (Hidden Markov Model), etc., and decomposes the sentence depending on the recognized result (the Hidden Markov Model is obtained by statistically modeling units of voices, such as phonemes and words, and has a status transition structure). Further, the understanding object 72 determines that the voice input sentence is an interrogative one, what are the subject (S) and the predicate (V), respectively, and that the sentence asks for a liking to S (apparent S "ball" in Japanese).

In this example, the understanding object 72 takes "ball" out of the database 57 and determines that the "ball" has a high score of pleasure, i.e., it is a "favorite". The creation object 74 creates a reply "S+V" for the question "Do+S+V?", i.e., "I like a ball". Then, the execution object 75 creates a train of pronunciations corresponding to the created sentence, produces waveforms of the train of pronunciations, and delivers the waveforms through the speaker 17. As a result, a dialogue of question and reply regarding a liking is realized.

Similarly, when "Why do you like a ball?" is inputted, the understanding object 72 determines based on the sentence divided by the recognition object 71 that the inputted sentence is an interrogative one, what are the subject (S) and the predicate (V), respectively, and that the sentence asks the reason why S+V.

In this example, the understanding object 72 takes "ball" out of the database 57 and extracts the factor "able to kick", which determines the score of pleasure/unpleasure. Then, based on a sentence "S+V because OO" indicating the reason, the creation object 74 creates a reply sentence "S+V because I can kick it". Thereafter, the execution object 75 creates a train of pronunciations corresponding to the created sentence, produces waveforms of the train of pronunciations, and delivers the waveforms through the speaker 17. As a result, a dialogue of question and reply regarding a liking is realized.

Not only a noun, but also a nominalized verb (such as "playing" and a nominalized adjective (such as "the beautiful" or "the joyful") can be used as the subject S (apparent one in Japanese). This expands the width of sentence expressions.

Further, when the user asks, "Do you like it?", while pointing at a ball, the recognition object 71 divides the inputted sentence, and thereafter the understanding object 72 understands that "it" corresponding to S (apparent S in Japanese) in the inputted sentence is a demonstrative pronoun. Then, the locomotion robot 1 determines based on an image input what the user points at, and combines "it" with "ball". After combining a demonstrative pronoun with a particular thing in that way, processing is executed in the same manner as that described above.

FIG. 8 shows one example of the operation of the dialogue mechanism 70 executed when the locomotion robot 1 recognizes an object with a camera.

When a recognizable thing, e.g., a ball, is put within the visual field of the locomotion robot 1, the locomotion robot 1 takes in an image of the thing with the camera 15. Then, the recognition object 71 determines that the taken-in image represents a ball.

The understanding object 72 takes out "ball" by referring to the database 57 and determines that the "ball" has a high score of pleasure, i.e., it is a "favorite".

Correspondingly, the creation object 74 creates a sentence of "S+V", i.e., "I like a ball". Then, the execution object 75 creates a train of pronunciations corresponding to the created sentence, produces waveforms of the train of pronunciations, and delivers the waveforms through the speaker 17. As a result, expression about a liking of the locomotion robot 1 itself can be realized.

Finally, examples of sentences created with application of the dialogue mechanism 70 according to this embodiment are listed below.

(1) The locomotion robot asks, "What is this?", upon looking at a thing whose name is unknown.

(2) It says, "This is OO.", upon looking at a thing whose name is known.

(3) Based on the parameter values of the instinct model and the emotion model in itself, it says, "OO is XX".

Ex.) With a high score of "hunger (recharge)", it says, "I am hungry".

Ex.) With a high score of "joy", it says, "I am joyful".

(4) For a matter that satisfies the instinct or emotion of the locomotion robot, it says, "I want to XX (OO)".

Ex.) To satisfy the exercise instinct, it says, "I want to kick a ball".

Ex.) To relieve thirst, it says, "I want to drink water".

(5) In response to a word "OO!" uttered from a user, it understands that the word represents an imperative sentence, and replies, "I OO".

Supplements

The present invention has been described above in detail in connection with a particular embodiment. It is, however, apparent that those skilled in the art can make modifications and substitutions on the above-described embodiment without departing from the scope of the present invention.

While the embodiment in which the present invention is applied to a pet robot has been primarily explained in this specification, the gist of the present invention is not always limited to products called "robots". In other words, the present invention is similarly applicable to products belonging to other industrial fields, e.g., toys, so long as the product is a mechanical device that performs movements in imitation of human behaviors by utilizing electric or magnetic actions. As a matter of course, the present invention can be further applied to animation characters, etc. operated based on computer graphics (CG).

Thus, the present invention has been disclosed above only by way of example, and should not be interpreted in a limiting way. The gist of the present invention should be judged in consideration of the scope of the claims.

INDUSTRIAL APPLICABILITY

According to the present invention, there are provided a superior robot device, a control method for the robot device, and a storage medium product, which are applicable to robot devices or the likes, such as a walking robot device or a multi-articulated robot, which operates in response to commands from users and/or ambient environments, or animation characters, etc. operated based on computer graphics (CG).

Also, according to the present invention, there are provided a superior robot device capable of creating and uttering sentences depending on internal statuses of the robot device or the like, thereby expressing the internal statuses, a control method for the robot device, and a storage medium product.

With the robot device and the control method for the robot device according to the present invention, the robot device or the like can express its internal statuses using words. As a result, anyone is able to easily confirm the internal statuses of the robot device or the like. For example, anyone is able to understand a liking of the robot or to make deeper communication with the robot. It is also possible to enlarge the extent of dialogues between human beings and the robot device or the like, to increase familiarity therebetween, and to facilitate empathy so that users feel more familiar with the robot device or the like. Consequently, cohabitation between human beings and the robot device or the like can be realized with more ease.

Further, with the robot device and the control method for the robot device according to the present invention, the robot device or the like can express, using words, emotions varying upon interaction with the real world. Therefore, a robot device or the like being more easily understandable and more familiar with everyone can be designed and manufactured. It is hence possible to enhance amusingness and entertainingness of the robot device or the like.

With the robot device and the control method for the robot device according to the present invention, the internal status (emotions are regarded as being a part of the internal status) is not associated with a sentence, but it exists independently of the system and is always varied depending on various external inputs and internal changes of the system. Accordingly, even when the same question is made on a robot device or the like, the contents of a reply are changed depending on the internal status of the robot device or the like at that time, and a manner of providing a reply also differs depending on the internal status. It is to be particularly put in mind that internal statuses are not associated with sentences, but the sentences are created depending on the internal statuses.

Moreover, with the robot device and the control method for the robot device according to the present invention, since sentences are uttered depending on internal statuses, it is able to create a sentence in response to not only an external stimulus, i.e., a question from the user, but also various internal stimuli or internal statuses. The present invention can also be implemented as one variation such that factors for changes of the internal status are reflected upon the sentences. Additionally, sentences reflecting the internal statuses and sentences explaining the internal statuses can also be created on the basis of information regarding verbs and adjectives as well as pronouns.

The invention claimed is:

1. A robot device having the function of dialoguing with users, comprising:
   external status input means for inputting an external status;
   internal status managing means for managing an internal status based on classification of external status along with emotions updated with experiences and learning;
   dialogue control means for reflecting a change of the internal status upon a dialogue with a user; and
   dialogue means for having a dialogue with the user.

2. A robot device having the function of dialoguing with users, comprising:
   external status input means for inputting an external status;
   external status recognizing means for recognizing the inputted external status;
   external status understanding means for understanding a meaning and implications of the recognized external status in the sentence form;
   internal status managing means for managing an internal status based on classification of external status along with emotions updated with experiences and learning;
   dialogue sentence creating means for creating a dialogue sentence based on a recognized result of the external status in comparison with the internal status; and
   output means for externally outputting the created dialogue sentence.

3. A robot device according to claim 2, wherein the internal status is constituted as an emotion of said robot device.

4. A robot device according to claim 2, wherein said internal status managing means changes the internal status in response to a change of the external status.

5. A robot device according to claim 2, further comprising storage means for storing results obtained by classifying external statuses along with internal statuses, said dialogue sentence creating means creating a dialogue sentence using information stored in said storage means.

6. A robot device according to claim 2, further comprising:
   action/behavior creating means for creating an action or a behavior of a robot body based on the recognized result of the external status in comparison with the internal status; and
   robot body control means for realizing the created action or behavior of said robot body.

7. A control method for a robot device having the function of dialoguing with users, comprising the steps of:
   an external status input step of inputting an external status;
   an internal status managing step of managing an internal status based on classification of external status along with emotions updated with experiences and learning;
   a dialogue control step of reflecting a change of the internal status upon a dialogue with a user; and
   an output step of outputting the dialogue to the user.

8. A control method for a robot device having the function of dialoguing with users, comprising the steps of:
   an external status input step of inputting an external status;
   an external status recognizing step of recognizing the inputted external status;
   an external status understanding step of understanding a meaning and implications of the recognized external status in the sentence form;
   an internal status managing step of managing an internal status based on classification of external status along with emotions updated with experiences and learning;
   a dialogue sentence creating step of creating a dialogue sentence based on a recognized result of the external status in comparison with the internal status; and
   an output step of externally outputting the created dialogue sentence.

9. A control method for a robot device according to claim 8, wherein the internal status is constituted as an emotion of said robot device.

10. A control method for a robot device according to claim 8, wherein said internal status managing step changes the internal status in response to a change of the external status.

11. A control method for a robot device according to claim 8, wherein said dialogue sentence creating step creates a dialogue sentence using a database in which results obtained by classifying external statuses are stored along with internal statuses.

12. A control method for a robot device according to claim 8, further comprising the steps of:
   an action/behavior creating step of creating an action or a behavior of a robot body based on the recognized result of the external status in comparison with the internal status; and
   a robot body control step of realizing the created action or behavior of said robot body.

13. A dialogue device for dialoguing with users, comprising:
   external status input means for inputting an external status;
   internal status managing means for managing an internal status based on classification of external status along with emotions updated with experiences and learning;
   dialogue control means for reflecting a change of the internal status upon a dialogue with a user; and
   dialogue means for having a dialogue with the user.

14. A dialogue device for dialoguing with users, comprising:
   external status input means for inputting an external status;
   external status recognizing means for recognizing the inputted external status;
   external status understanding means for understanding a meaning and implications of the recognized external status in the sentence form;
   internal status managing means for managing an internal status based on classification of external status along with emotions updated with experiences and learning;
   dialogue sentence creating means for creating a dialogue sentence based on a recognized result of the external status in comparison with the internal status; and
   output means for externally outputting the created dialogue sentence.

15. A dialogue device according to claim 14, wherein said internal status managing means changes the internal status in response to a change of the external status.

16. A dialogue device according to claim 14, further comprising storage means for storing results obtained by classifying external statuses along with internal statuses, said dialogue sentence creating means creating a dialogue sentence using information stored in said storage means.

17. A dialogue control method in dialoguing with users, comprising the steps of:
   an external status input step of inputting an external status;
   an internal status managing step of managing an internal status based on classification of external status along with emotions updated with experiences and learning;
   a dialogue control step of reflecting a change of the internal status upon a dialogue with a user; and
   an output step of outputting the dialogue to the user.

18. A dialogue control method in dialoguing with users, comprising the steps of:
   an external status input step of inputting an external status;
   an external status recognizing step of recognizing the inputted external status;
   an external status understanding step of understanding a meaning and implications of the recognized external status in the sentence form;
   an internal status managing step of managing an internal status based on classification of external status along with emotions updated with experiences and learning;
   a dialogue sentence creating step of creating a dialogue sentence based on a recognized result of the external status in comparison with the internal status; and
   an output step of externally outputting the created dialogue sentence.

19. A dialogue method according to claim 18, wherein said internal status managing step changes the internal status in response to a change of the external status.

20. A dialogue method for a robot device according to claim 18, wherein said dialogue sentence creating step creates a dialogue sentence using a database in which results obtained by classifying external statuses are stored along with internal statuses.

21. A storage medium product physically storing, in the computer readable form, computer software described so as to execute, on a computer system, control of a robot device having the function of dialoguing with users, said computer software comprising the steps of:
   an external status input step of inputting an external status;
   an external status recognizing step of recognizing the inputted external status;
   an external status understanding step of understanding a meaning and implications of the recognized external status in the sentence form;
   an internal status managing step of managing an internal status based on classification of external status along with emotions updated with experiences and learning;
   a dialogue sentence creating step of creating a dialogue sentence based on a recognized result of the external status in comparison with the internal status; and
   an output step of externally outputting the created dialogue sentence.

22. A storage medium product physically storing, in the computer readable form, computer software described so as to execute a dialogue process with users on a computer system, said computer software comprising the steps of:
   an external status input step of inputting an external status;
   an external status recognizing step of recognizing the inputted external status;
   an external status understanding step of understanding a meaning and implications of the recognized external status in the sentence form;
   an internal status managing step of managing an internal status based on classification of external status along with emotions updated with experiences and learning;
   a dialogue sentence creating step of creating a dialogue sentence based on a recognized result of the external status in comparison with the internal status; and
   an output step of externally outputting the created dialogue sentence.

* * * * *